US007907321B2

(12) United States Patent
Mizumaki et al.

(10) Patent No.: US 7,907,321 B2
(45) Date of Patent: Mar. 15, 2011

(54) LIGHT-AMOUNT ADJUSTING APPARATUS, OPTICAL APPARATUS, AND METHOD FOR MANUFACTURING THE LIGHT-AMOUNT ADJUSTING APPARATUS

(75) Inventors: Masao Mizumaki, Yokohama (JP); Hiroshi Akada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 12/025,215

(22) Filed: Feb. 4, 2008

(65) Prior Publication Data

US 2008/0192326 A1 Aug. 14, 2008

(30) Foreign Application Priority Data

Feb. 8, 2007 (JP) ................................ 2007-029757
Feb. 20, 2007 (JP) ................................ 2007-040091

(51) Int. Cl.
*G02B 26/02* (2006.01)
(52) U.S. Cl. .......... 359/234; 359/227; 359/230; 396/510
(58) Field of Classification Search .................. 359/227, 359/230, 234; 396/493, 496, 510
See application file for complete search history.

(56) References Cited

U.S. PATENT DOCUMENTS 6,858,959 B2 * 2/2005 Aoshima .................. 310/156.32
7,290,947 B2 * 11/2007 Naganuma ..................... 396/453

* cited by examiner

*Primary Examiner* — James Phan
(74) *Attorney, Agent, or Firm* — Cowan, Liebowitz & Latman, P.C.

(57) ABSTRACT

A light-amount adjusting apparatus includes a plurality of light-amount adjusting blades that causes a size of a light-passing aperture to change by rotation thereof. Each of the light-amount adjusting blades includes a base portion on which a rotation center portion and a driven portion are formed, and a blade portion that overlaps another light-amount adjusting blade in a light-passing direction so as to form the light-passing aperture. A thickness of the blade portion is thinner than that of the base portion. When the plurality of light-amount adjusting blades is rotated to set the light-passing aperture to be smaller than a full-opened aperture, a thickness of a portion that overlaps an adjacent stop blade is thinner than that of a portion that does not overlap the adjacent stop blade in each of the light-amount adjusting blades. The blades have high dimension accuracy, and deterioration of the optical performance of the apparatus is reduced.

5 Claims, 16 Drawing Sheets

PRIOR ART

PRIOR ART

LIGHT-AMOUNT ADJUSTING APPARATUS, OPTICAL APPARATUS, AND METHOD FOR MANUFACTURING THE LIGHT-AMOUNT ADJUSTING APPARATUS

BACKGROUND OF THE INVENTION

The present invention relates to a light-amount adjusting apparatus used for optical apparatuses such as an interchangeable lens, a video camera, a digital still camera and a projector.

Cameras and interchangeable lenses are provided with an aperture stop apparatus (light-amount adjusting apparatus) whose aperture diameter can be changed to adjust a depth of field and a light amount reaching on an image-pickup plane of the image-pickup element, a film or the like. Many projection optical systems of projectors that project light from an image modulation element such as a liquid crystal panel are also provided with a similar type of light-amount adjusting apparatus.

Such a light-amount adjusting apparatus includes a so-called iris diaphragm whose aperture diameter can be changed by rotation of a plurality of (equal to or more than three) stop blades, like an iris of human eye. A boss portion and a hole portion for making a rotation center portion and a driven portion receiving a driving force are formed at a base portion of each stop blade used for the iris diaphragm.

Moreover, in each stop blades, the blade portion located further away than the base portion from the boss portion overlaps another stop blade in an optical axis direction to form the aperture that allows light to pass through.

In the conventional stop blades, the boss portion is formed of a metal boss member mechanically caulked on a metal sheet or a plastic sheet forming the blade portion and the base portion. Alternately, resin is outsert-molded to form the boss portion on the sheet. Thus, the stop blade needs many manufacturing steps, and the manufactured stop blade includes a problem in reliability.

To address these problems, Japanese Patent Laid-Open No. 6-317826 discloses a method for manufacturing a stop blade including the boss portion, in which the manufacturing steps thereof is significantly reduced by integrally forming the base portion and the boss portion with injection molding.

However, in the method for manufacturing the stop blade disclosed in Japanese Patent Laid-Open No. 6-317826, flow of resin for injection molding worsens as the thickness of the stop blade is reduced, thereby causing defects that dimension accuracy is reduced or a burr is easily generated on a peripheral portion of the stop blade. In contrast, a burden for driving the stop blade is increased as the thickness of the stop blade is increased, which increases the size of the aperture stop apparatus in its thickness direction. Moreover, a step formed between the stop blade and the aperture becomes larger when the thickness of the stop blade is increased, which causes a so-called small-aperture diffraction that deteriorates optical performance.

Further, as disclosed in Japanese Patent Laid-Open No. 2006-84658, the stop blade used for the light-amount adjusting apparatus described above is molded with resin using an injection mold constituted by a fixed mold and a movable mold.

Forming surfaces of the fixed mold and the movable mold have a fine rough shape. With these forming surfaces, a non-smooth shape (matt surface shape) for diffusely reflecting the light is transferred on both of the front and back surfaces and the peripheral end surface of the stop blade. The matt surface prevents the light coming from an object and reflected at the stop blade from becoming unnecessary light such as ghost.

However, in the stop blade disclosed in Japanese Patent Laid-Open No. 2006-84658, the fixed mold and the movable mold have a rough surface for transferring the matt surface shape to the stop blade also at their boundary (part forming the peripheral portion of the stop blade), so that the rough surfaces of these molds which are put together to form the peripheral portion of the stop blade generate the burr at the peripheral portion.

FIG. 20 shows a manufacturing state in which the stop blade disclosed in Japanese Patent Laid-Open No. 2006-84658 is formed. Reference symbol P represents a boundary line (parting line) between the movable mold and the fixed mold, and a hatched portion represents a stop blade 53 to be molded. Rough surfaces 51 and 52 respectively formed in the fixed mold and the movable mold are put together at their boundary T. FIG. 21 is an enlarged view of the boundary T shown in FIG. 20.

As shown in FIG. 21, a burr 53a is generated at the peripheral portion of the stop blade. The burr 53a is generated by resin flowing into a narrow space formed by the rough surfaces of the movable mold and the fixed mold that are put together at the boundary, the burr 53a extending in the same direction as that of the parting line P.

The burr thus generated at the peripheral portion of the stop blade that determines the aperture diameter makes an area of a region through which the light actually passes smaller than a designed value of the aperture diameter. In addition, light entering a thin translucent burr is refracted at an unexpected angle, thereby resulting in unnecessary light.

Moreover, when the burrs on the stop blades make contact with each other in the assembling or operation of the aperture stop apparatus, the burrs may be removed from the stop blade to generate dust.

BRIEF SUMMARY OF THE INVENTION

The present invention provides a thin light-amount adjusting apparatus in which light-amount adjusting blades have high dimension accuracy and deterioration of the optical performance is reduced, an optical apparatus including the same, and a method for manufacturing the light-amount adjusting apparatus.

The present invention further provides a light-amount adjusting apparatus in which generation of burrs at a peripheral portion of a light-amount adjusting blade that is molded with resin is reduced and a good optical performance is ensured, an optical apparatus including the same, and a method for manufacturing the light-amount adjusting apparatus.

According to an aspect, the present invention provides a light-amount adjusting apparatus including a plurality of light-amount adjusting blades that causes a size of a light-passing aperture to change by rotation thereof. Each of the light-amount adjusting blades includes a base portion on which a rotation center portion and a driven portion are formed, and a blade portion that overlaps another light-amount adjusting blade in a light-passing direction so as to form the light-passing aperture. A thickness of the blade portion is thinner than that of the base portion. when the plurality of light-amount adjusting blades is rotated to set the light-passing aperture to be smaller than a full-opened aperture, a thickness of a portion that overlaps an adjacent stop blade is thinner than that of a portion that does not overlap the adjacent stop blade in each of the light-amount adjusting blades.

According to another aspect, the present invention provides a light-amount adjusting apparatus including a plurality of light-amount adjusting blades molded with resin. A first blade surface and a peripheral end surface of each of the light-amount adjusting blades have a non-smooth shape on which light is diffusely reflected. A second blade surface provided on an opposite side to the first blade surface in each of the light-amount adjusting blade includes a first area having the non-smooth shape and a second area having a shape smoother than the non-smooth shape between a peripheral edge of the second blade surface and the first area. The peripheral end surface of each of the light-amount adjusting blade is an inclined surface in which an edge portion on a first blade surface side is located more inwardly of the light-amount adjusting blade than another edge portion on a second blade surface side.

According to still another aspect, the present invention provides an optical apparatus including the above light-amount adjusting apparatus.

According to still further another aspect, the present invention provides a method for manufacturing a light-amount adjusting apparatus that includes a plurality of light-amount adjusting blades causing a size of a light-passing aperture to change by rotation thereof. The method includes a first step of integrally forming each of the light-amount adjusting blades by injection molding with resin such that each of the light-amount adjusting blades includes a base portion on which two boss portions serving as a rotation center portion and a driven portion are formed and a blade portion that overlaps another light-amount adjusting blade in a light-passing direction so as to form the light-passing aperture, such that a thickness of the blade portion is thinner than that of the base portion, and such that, when the plurality of light-amount adjusting blades is rotated to set the light-passing aperture to be smaller than a full-opened aperture, a thickness of a portion that overlaps an adjacent stop blade is thinner than that of a portion that does not overlap the adjacent stop blade. The method further includes a second step of assembling the light-amount adjusting apparatus using the plurality of light-amount adjusting blades. In the first step, an injection gate is disposed at a position where one of the two boss portions is located, an ejector pin is disposed at a position where the other boss portion is located.

According to yet still further another aspect, the present invention provides a method for manufacturing a light-amount adjusting apparatus including a plurality of light-amount adjusting blades. The method includes a first step of forming each of the light-amount adjusting blades by molding with resin, by using a first mold for forming a first blade surface and a peripheral end surface of each of the light-amount adjusting blade and a second mold for forming a second blade surface of each of the light-amount adjusting blade, the second blade surface being an opposite side surface to the first blade surface, and a second step of assembling the light-amount adjusting apparatus using the light-amount adjusting blades.

In the first step, the first blade surface and the peripheral end surface are formed by the first mold such that these surfaces have a non-smooth shape on which light is diffusely reflected and such that the peripheral end surface has an edge portion on a first blade surface side that is located more inwardly of the light-amount adjusting blade than another edge portion on a second blade surface side. The second blade surface is formed by the second mold so as to include a first area having the non-smooth shape and a second area having a smoother shape than the non-smooth shape between the peripheral end surface and the first area.

Other aspects of the present invention will be apparent from the embodiments described below with reference to the drawings.

DETAILED DESCRIPTION OF THE PREFERRED EMBODIMENTS

Exemplary embodiments of the present invention will be described below with reference to the accompanied drawings.

Embodiment 1

Figure 8:
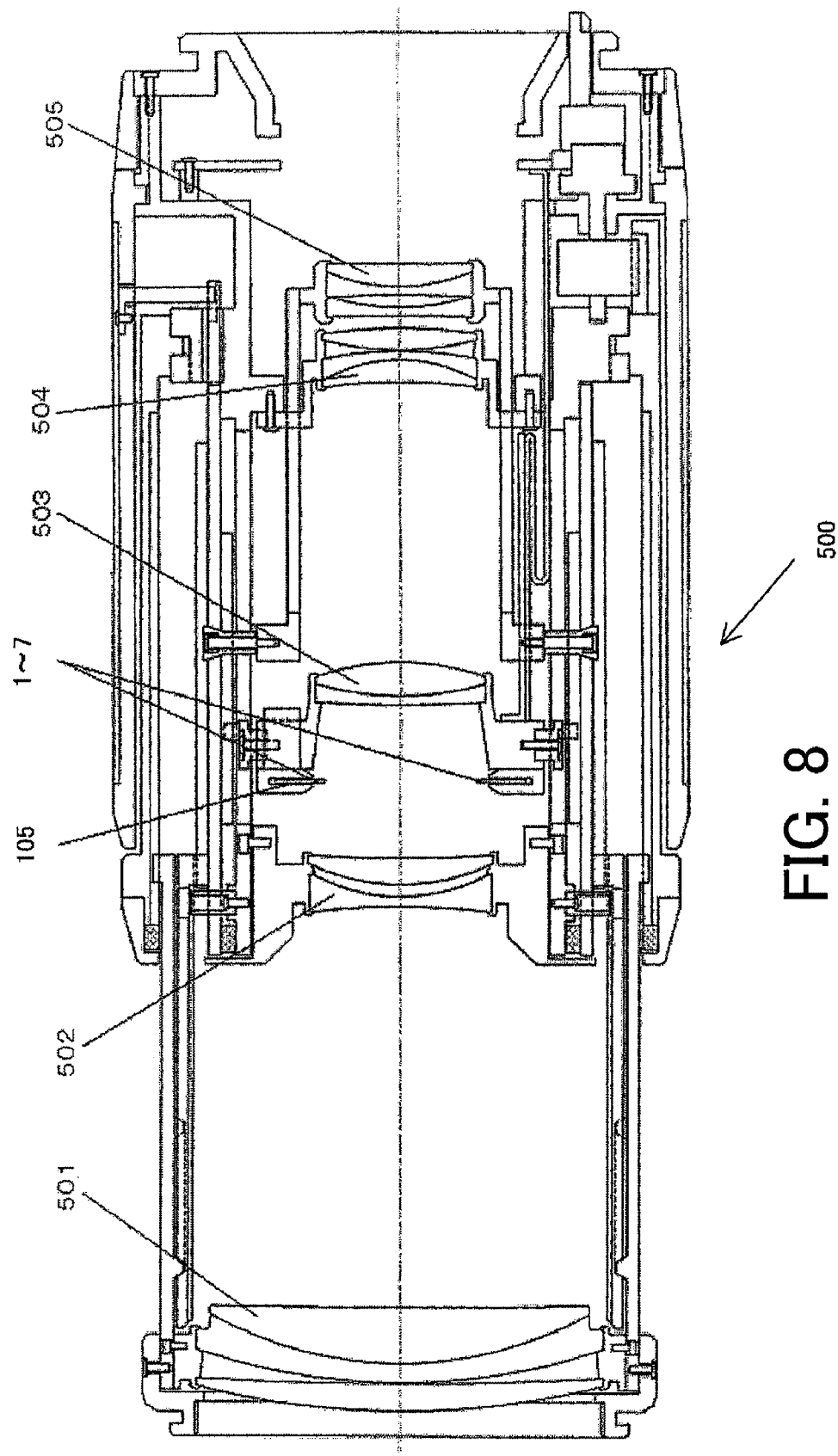
FIG. 8 is a figure showing an optical apparatus provided with the aperture stop unit of Embodiment 1.

FIG. 8 shows an interchangeable lens apparatus 500 including a light-amount adjusting apparatus that is Embodiment 1 of the present invention. The interchangeable lens apparatus 500 is detachably mounted to an image-pickup apparatus (not shown) such as a digital still camera and a video camera.

In the interchangeable lens apparatus (optical apparatus) 500, reference numerals 501, 502, 503, 504 and 505 respectively denote a first lens unit to a fifth lens unit. Reference numeral 105 denotes an aperture stop unit serving as the light-amount adjusting apparatus, which is disposed between the second lens unit 502 and the third lens unit 503.

The first lens unit 501 to the fifth lens unit 505 that constitute an image-pickup optical system form an object image on the image-pickup element such as a CCD sensor and a CMOS sensor provided in the image-pickup apparatus. The image-pickup element generates an image by photoelectrically converting the object image.

The aperture stop unit 105 changes a diameter of its aperture described later so as to adjust the amount of light entering the interchangeable lens apparatus 500 from an object (not shown) and then reaching the image-pickup element. Hereinafter, the aperture of the aperture stop unit 105 is referred to as the stop aperture.

While FIG. 8 shows a case where the aperture stop unit 105 is provided in the interchangeable lens apparatus 500 constituting part of an image-pickup system of lens interchangeable type, the aperture stop unit 105 may be provided in a lens-integrated image-pickup apparatus (optical apparatus).

Figure 1:
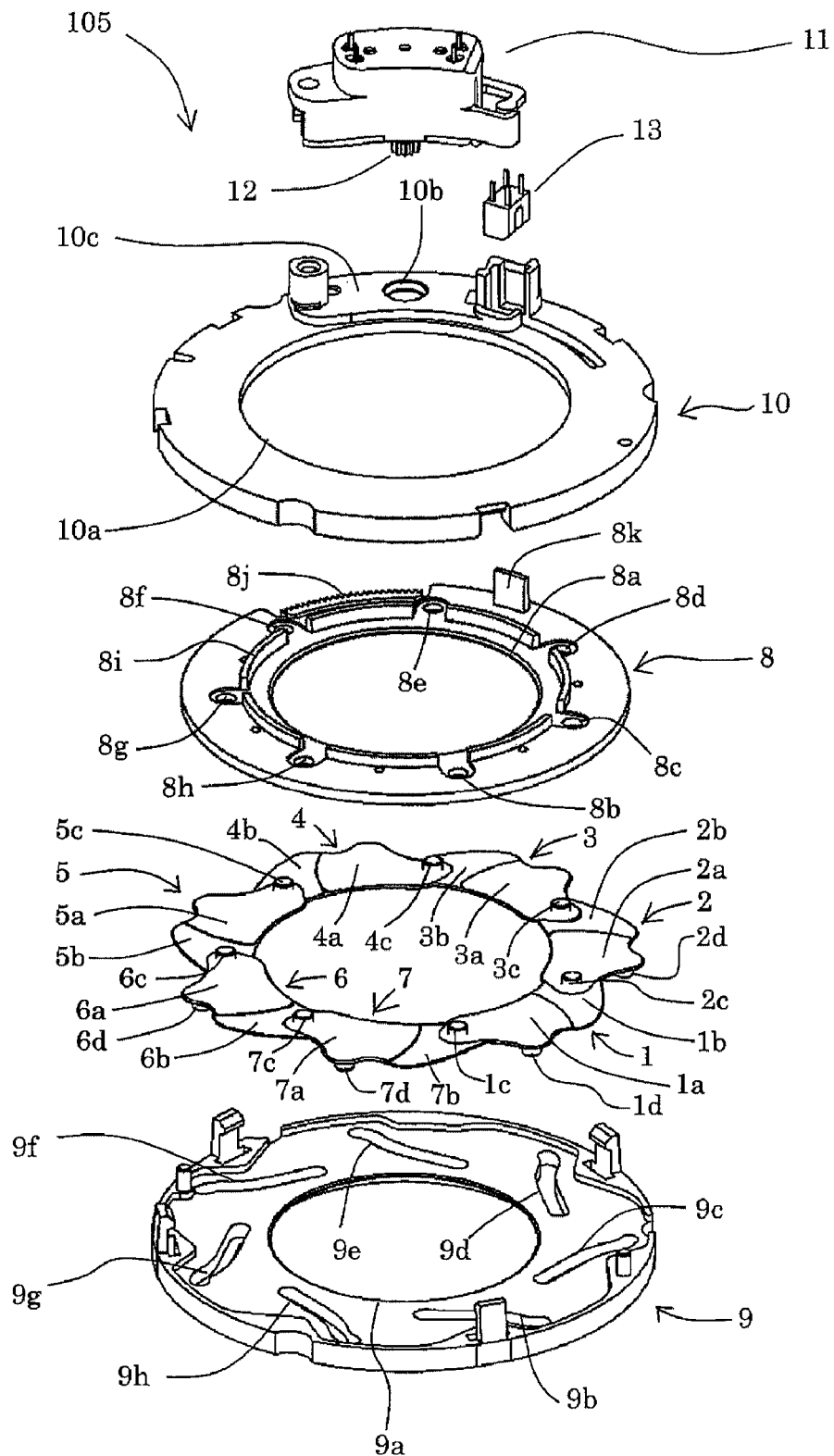
FIG. 1 is an exploded perspective view showing an aperture stop unit that is Embodiment 1 of the present invention.
Figure 2:
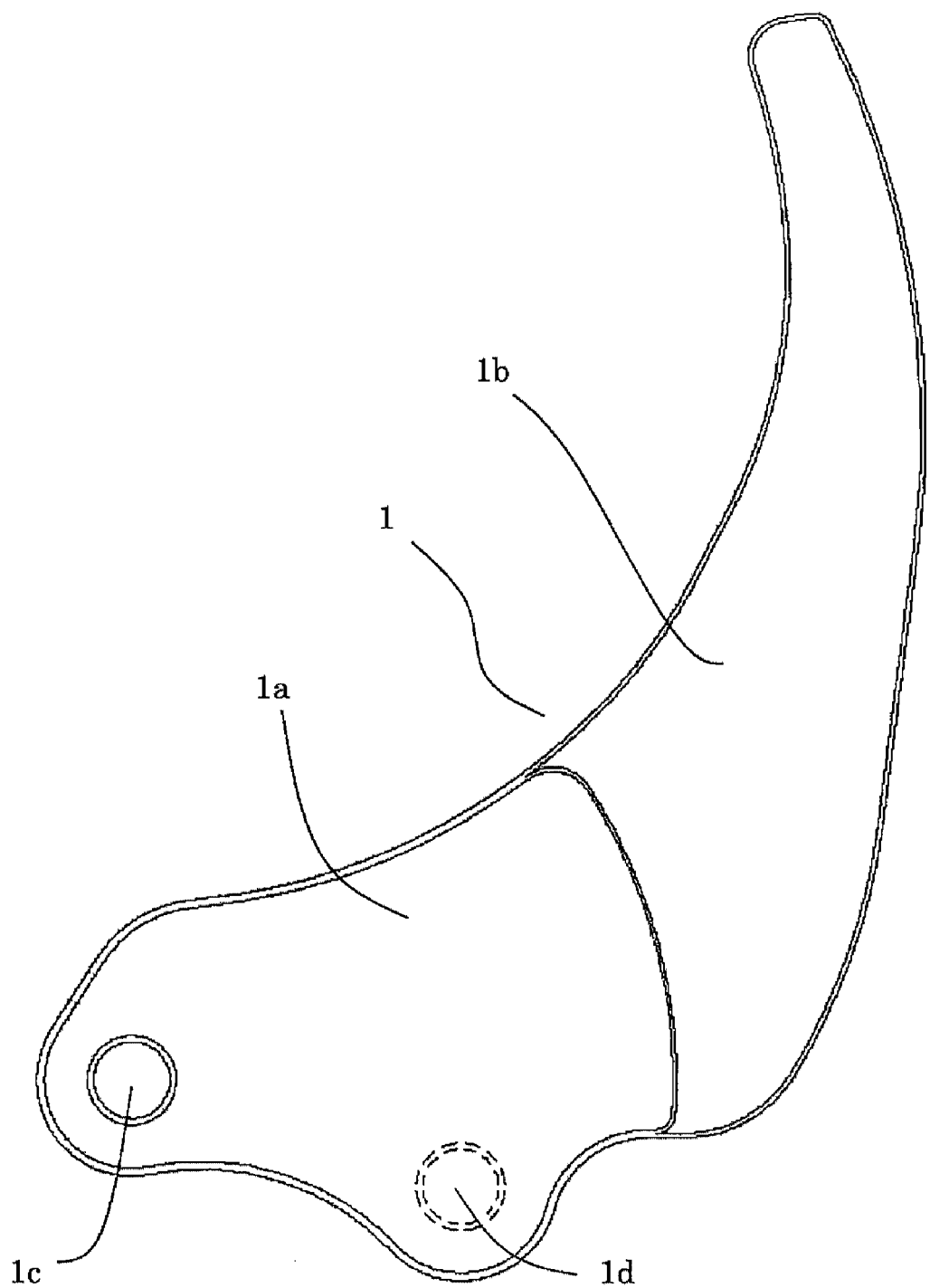
FIG. 2 is a plane view showing a stop blade used for the aperture stop unit of Embodiment 1.
Figure 3:
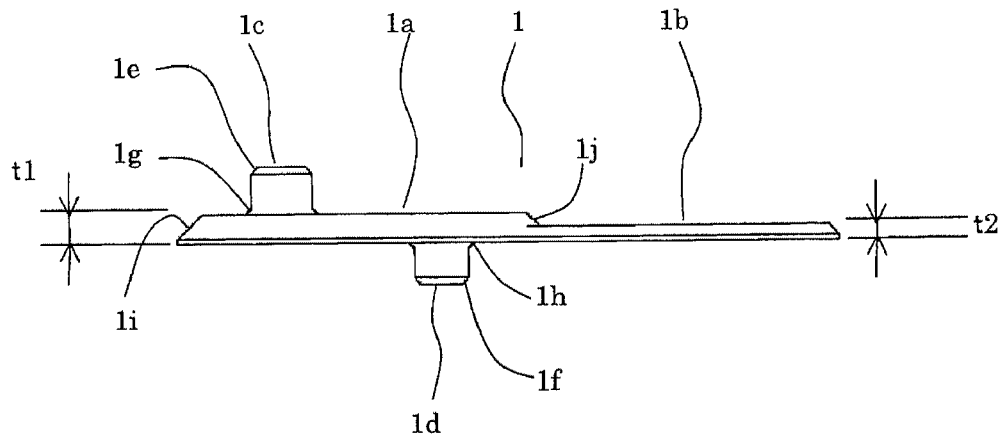
FIG. 3 is a side view showing the stop blade in Embodiment 1.

FIG. 1 is an exploded view of the aperture stop unit 105. FIGS. 2 and 3 are respectively a top plane view and a side view of one of the stop blades used for the aperture stop unit 105.

In FIG. 1, reference numerals 1, 2, 3, 4, 5, 6 and 7 denote stop blades serving as light-amount adjusting blades. Each of the stop blades 1 to 7 is integrally molded with synthetic resin in a shape of a thin plate. The stop blades 1 to 7 respectively include base portions $1a$, $2a$, $3a$, $4a$, $5a$, $6a$ and $7a$ and blade portions $1b$, $2b$, $3b$, $4b$, $5b$, $6b$ and $7b$. The blade portion is thinner than the base portion.

On one of two surfaces of the respective base portions $1a$ to $7a$, first boss portions $1c$, $2c$, $3c$, $4c$, $5c$, $6c$ and $7c$ having a cylindrical shape are formed to serve as a rotation center portion of each stop blade. Additionally, on the other surface of the respective base portions $1a$ to $7a$, second boss portions $1d$, $2d$, $3d$, $4d$, $5d$, $6d$ and $7d$ (note that only second boss portions $1d$, $2d$, $6d$ and $7d$ are shown in FIG. 1) having a cylindrical shape are formed to serve as a driven portion of each stop blade to which a driving force is to be input.

Reference numeral 8 denotes a rotating member having a ring shape and formed with an aperture portion $8a$ at a center thereof. The rotating member 8 includes boss hole portions $8b$, $8c$, $8d$, $8e$, $8f$, $8g$ and $8h$ formed at seven portions therein in its circumferential direction, rib portions $8i$ divided into seven in the circumferential direction, and a gear portion $8j$ formed at part of the rotating member 8 in the circumferential direction. The rotating member 8 also includes a light-shielding portion $8k$ at one place therein in the circumferential direction.

Reference numeral 9 denotes a ring-shaped cam member serving as a base member of the aperture stop unit 105 of this embodiment. An aperture portion $9a$ is formed at a center of the cam member 9. Seven cam groove portions $9b$, $9c$, $9d$, $9e$, $9f$, $9g$ and $9h$ are formed in the cam member 9 in its circumferential direction.

Reference numeral 10 denotes a ring-shaped retaining member formed with an aperture portion $10a$ at a center thereof. The retaining member 10 is provided with a hole portion $10b$ and a motor attachment portion $10c$ at one place therein in its circumferential direction.

Reference numeral 11 denotes a stepping motor driving the rotating member 8. A pinion gear 12 is attached to an output shaft of the stepping motor 11. The stepping motor 11 is fixed to the motor attachment portion $10c$ of the retaining member 10.

The pinion gear 12 penetrates through the hole portion $10b$ of the retaining member 10 and meshes with the gear portion $8j$ of the rotating member 8. The rotating member 8, the cam member 9, the stepping motor 11 and the pinion gear 12 constitute a driving mechanism.

Reference numeral 13 denotes an initial position sensor including a photo interrupter. When the light shielding portion $8k$ formed in the rotating member 8 is inserted between a light-projecting portion and a light-receiving portion of the initial position sensor 13, it can be detected that the rotating member 8 is located at an initial position.

The initial position described here corresponds to a position where the diameter (size) of the stop aperture (light-passing aperture) formed by the stop blades 1 to 7 is largest as a full-opened aperture.

The retaining member 10 is fixed to the cam member 9 such that the rotating member 8 and the stop blades 1 to 7 are disposed between the cam member 9 and the retaining member 10, and thus the retaining member 10 prevents the rotating member 8 and the stop blades 1 to 7 from disengaging from the cam member 9 in an optical axis direction (light-passing direction). The rib portions $8i$ of the rotating member 8 are rotatably inserted into the aperture portion $10a$ of the retaining member 10. Outer circumferential surfaces of the rib portions $8i$ of the rotating member 8 slide with respect to an inner circumferential surface of the aperture portion $10a$ of the retaining member 10 such that the rotating member 8 is rotatably supported. The first boss portions $1c$ to $7c$ of the stop blades 1 to 7 are respectively rotatably inserted into the boss hole portions $8b$ to $8h$ formed in the rotating member 8. Additionally, the second boss portions $1d$ to $7d$ are respectively inserted into the cam groove portions $9b$ to $9h$ formed in the cam member 9.

When the stepping motor 11 fixed to the retaining member 10 rotates the pinion gear 12, the rotating member 8 whose gear portion $8j$ meshes with the pinion gear 12 is rotated. Accordingly, the second boss portion of each stop blade moves along each cam groove portion formed in the cam member 9 (that is, the second boss portion receives the driving force from the cam groove portion) to rotate the stop blade about the first boss portion.

The stop blades 1 to 7 are arranged at even interval around an optical axis (a center position of the aperture portions $8a$ and $9a$). Parts of the stop blades 1 to 7 overlap each other to form the stop aperture, which is the light-passing aperture, at the inside of the stop blades 1 to 7. The rotation of the stop blades 1 to 7 changes the overlapping amount thereof, and thereby the diameter of the stop aperture (hereinafter referred to as the stop aperture diameter) changes continuously. The stop aperture diameter reduces as the overlapping amount of the stop blades 1 to 7 increases. The number of driving pulse signals sent to the stepping motor 11 is counted from the initial position as a reference detected by the initial position sensor 13 to control the stop aperture diameter, thereby enabling adjustment of the light amount.

Figure 4:
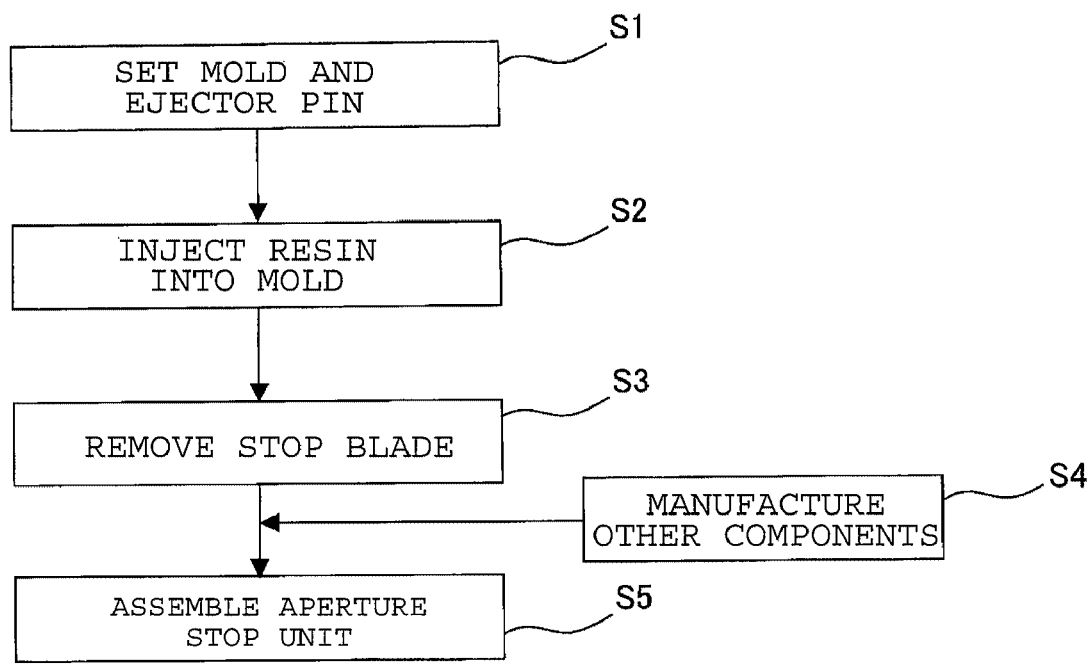
FIG. 4 is a flow chart showing a method for manufacturing the aperture stop unit of Embodiment 1.

Next, a method for manufacturing the stop blade and the aperture stop unit 105 will be described with reference to FIGS. 2 and 4. FIG. 4 is a flow chart showing the manufacturing method. FIG. 2 shows the stop blade 1 on behalf of seven stop blades 1 to 7. The shape of the stop blades 2 to 7 is the same as that of the stop blade 1.

In Step (shown as S in FIG. 1), an ejector pin and a mold including an injection gate are set in an injection molding apparatus (not shown). At this point, the injection gate is disposed at a position where the second boss portion 1d is located, the second boss portion 1d being located closer to a center of the stop blade 1 in a longitudinal direction thereof than the first boss portion 1c, and the ejector pin is disposed at a position where the first boss portion 1c is located. Note that the injection gate may be disposed at the position where the first boss portion 1c is located and the ejector pin may be disposed at the position where the second boss portion 1d is located.

In Step 2, molten synthetic resin is injected (filled) into the mold and then the resin is cured.

In Step 3, the cured stop blade 1 is pushed with the ejector pin to be removed from the mold.

In Step 4, components constituting the aperture stop unit 105 other than the stop blades 1 to 7 (the cam member 9, the rotating member 8, the retaining member 10, and the stepping motor 11) are manufactured.

Finally, in Step 5, the stop blades 1 to 7 removed from the mold in Step 3, the cam member 9, the rotating member 8, the retaining member 10, and the stepping motor 11 that are manufactured in Step 4 are combined with one another as described above to assemble the aperture stop unit 105.

In the manufacturing method described above, arranging the ejector pin and the injection gate at positions for the first boss portion 1c and the second boss portion 1d, respectively, provides the following effects. Since the injection gate is disposed at the position for the second boss portion 1d formed on the base portion 1a that is thicker than the blade portion 1b, the resin can stably flow into an end of the blade portion 1b to form the stop blade 1 having a shape of a thin plate as a whole in accurate dimension. Moreover, since the ejector pin is disposed at the position for the first boss portion 1c formed on the base portion 1a that is thicker than the blade portion 1b, warpage of the stop blade 1 can be prevented when being removed from the mold. Thereby, deterioration of the flatness of the stop blade 1 can be prevented.

Now, as shown in FIG. 3, a thickness t2 of the blade portion 1b is set to equal to or less than ½ of a thickness t1 of the base portion 1a in this embodiment. However, this is just an example, and it is only necessary that t1 and t2 satisfy a relationship of t1>t2.

As shown in FIG. 3, tapered surfaces 1e and 1f are respectively provided on tip ends of the first boss portion 1c and the second boss portion 1d. The tapered surfaces 1e and 1f can reduce sliding resistance of the first boss portion 1c and the second boss portion 1d against the boss hole portion 8b of the rotating member 8 and the cam groove portion 9b of the cam member 9.

Additionally, curved surfaces (they may be tapered surfaces) 1g and 1h are respectively provided at bases of the first boss portion 1c and the second boss portion 1d. The curved surfaces 1g and 1h can decrease resin-flow resistance and mold-release resistance in the injection mold. Thus, the stop blade 1 can be more stably formed, and each boss portion can be more strengthened.

A tapered surface (it may be a curved surface) 1i inclined with respect to a thickness direction of the stop blade 1 is formed at a peripheral end of the stop blade 1. Moreover, a tapered surface (it may be a curved surface) 1j inclined with respect to the thickness direction is also formed at a step portion between the base portion 1a and the blade portion 1b that have different thicknesses from each other. The tapered surfaces 1i and 1j prevent light incident on the peripheral end and the step portion of the stop blade 1 from being diffusely reflected and becoming unnecessary light such as ghost. The tapered surfaces 1i and 1j also prevent the stop blades 1 to 7 from getting caught in each other when overlapping each other, thereby reducing operation resistance of the stop blades 1 to 7.

Figure 5:
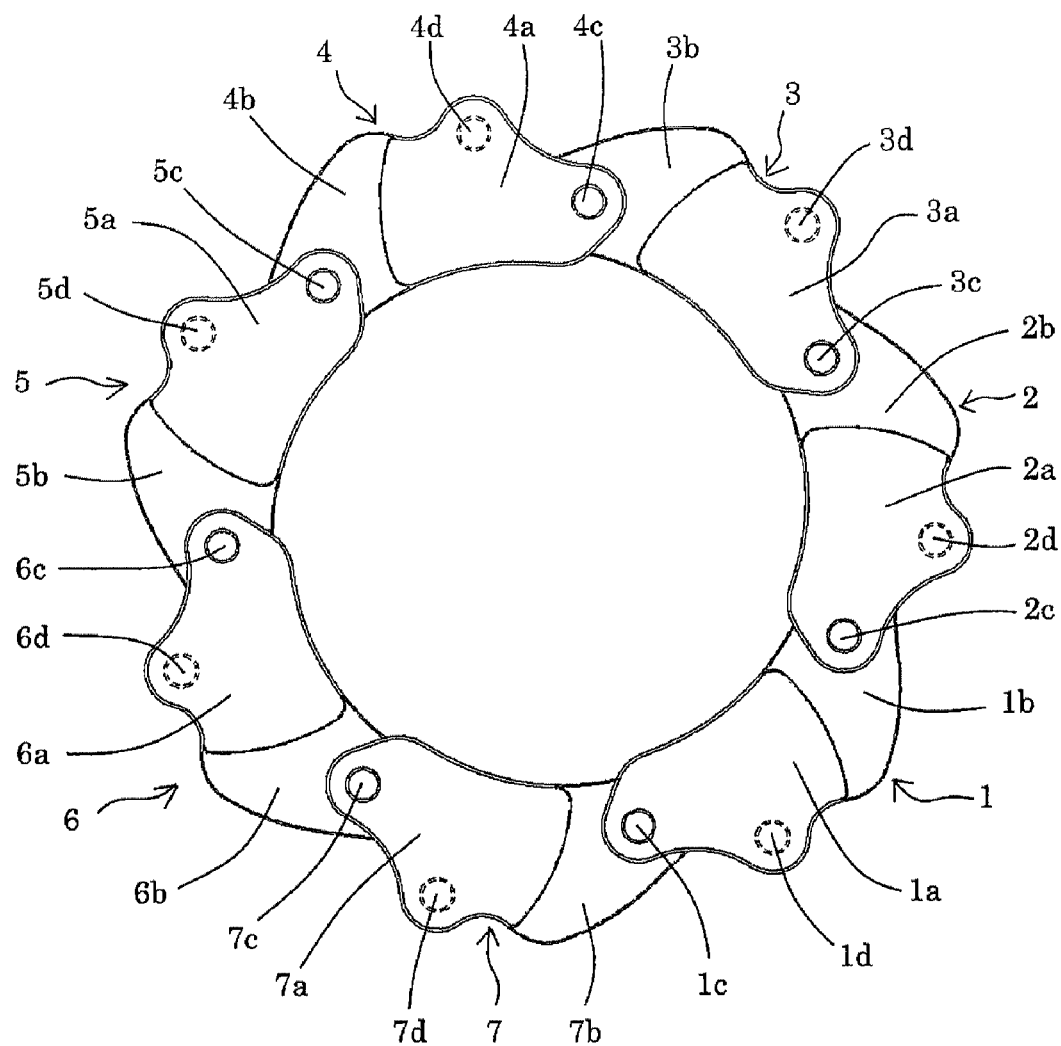
FIG. 5 is a figure showing the stop blades of the aperture stop unit of Embodiment 1 in a full-opened state when viewed in an optical axis direction.
Figure 6:
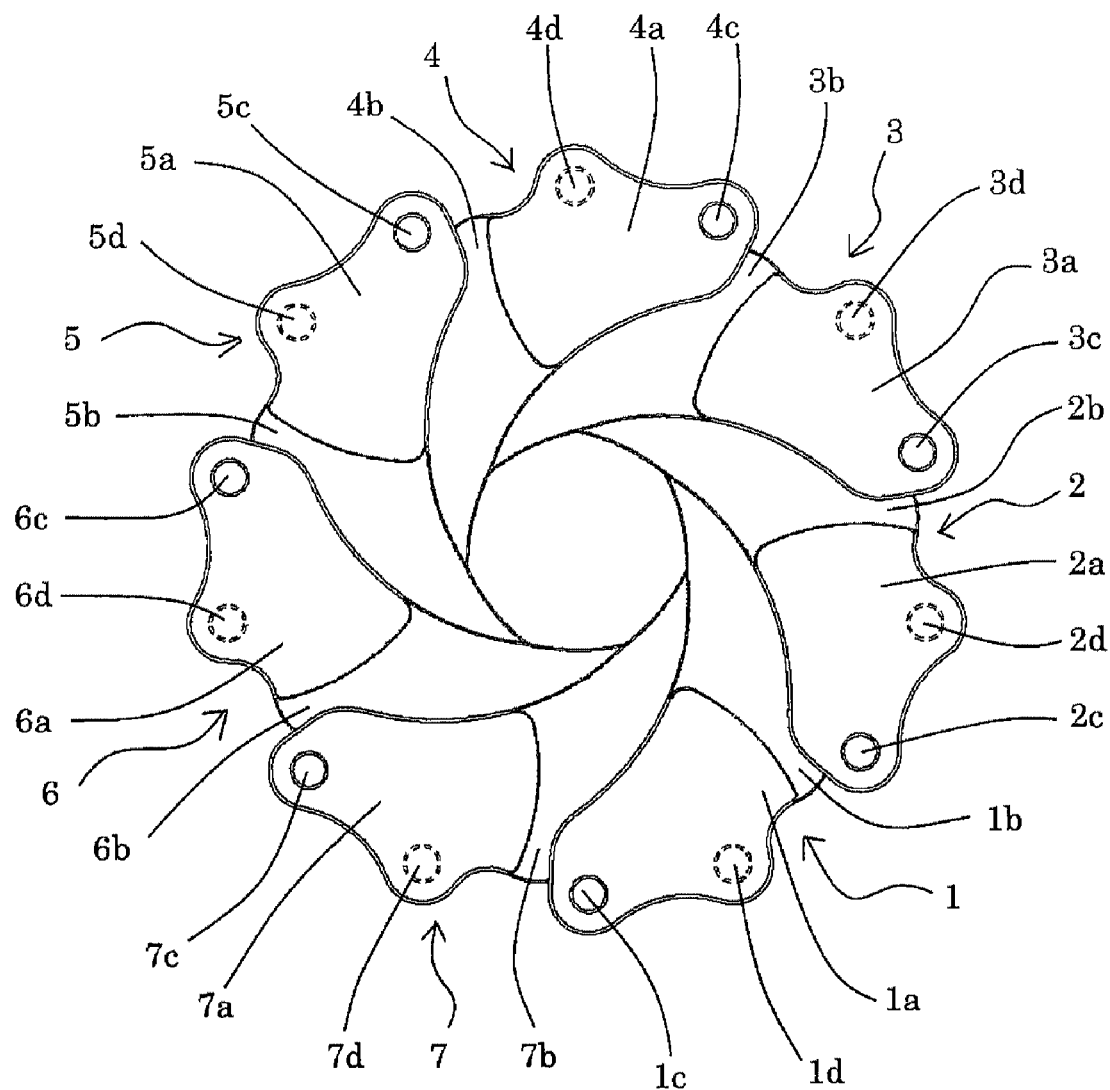
FIG. 6 is a figure showing the stop blades of the aperture stop unit of Embodiment 1 in a half-opened state.
Figure 7:
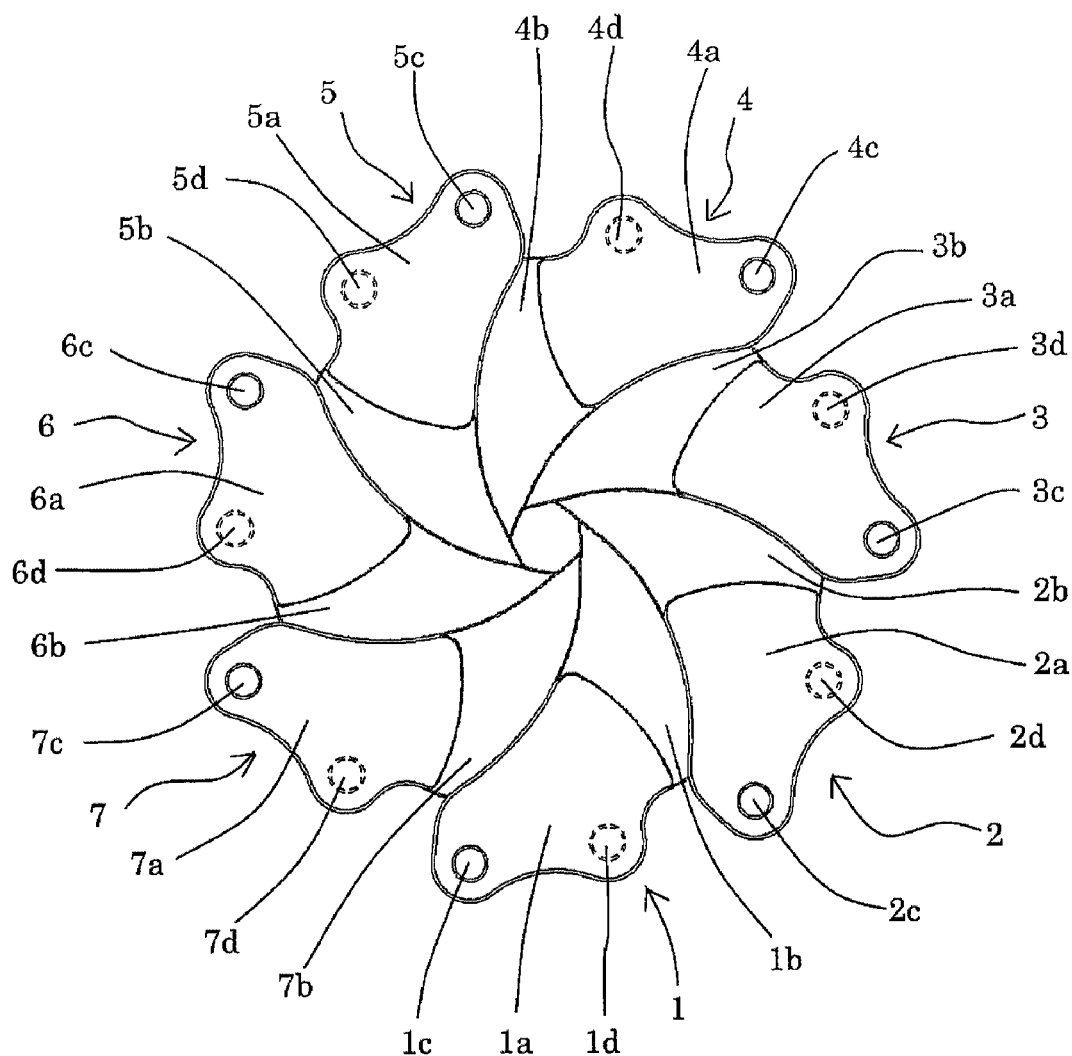
FIG. 7 is a figure showing the stop blades in the aperture stop unit of Embodiment 1 in a small-opened state.

FIGS. 5 to 7 show operation states of the stop blades 1 to 7 in the aperture stop unit 105 described above when viewed in the optical axis direction. FIG. 5 shows a full-opened state of the aperture stop unit 105, FIG. 6 shows a half-opened state thereof, and FIG. 7 shows a small-opened state thereof.

In any state of the full-opened state, the half-opened state, and the narrow-opened state, parts of the stop blades 1 to 7 overlap each other.

In the full-open state shown in FIG. 5, in respect of the stop blade 1 and the stop blade 2 that are adjacent to each other in a counterclockwise direction, the blade portion 1b of the stop blade 1 and the base portion 2a of the stop blade 2 overlap each other. Further, in respect of the stop blade 1 and the stop blade 7 that are adjacent to each other in a clockwise direction, the base portion 1a of the stop blade 1 and the blade portion 7b of the stop blade 7 overlap each other. In the full-open state, the stop aperture is formed by both of the base portions 1a to 7a and the blade portions 1b to 7b of the stop blades 1 to 7.

In the half-open state shown in FIG. 6 and in the small-open state (state in which the stop aperture diameter is smaller than a certain diameter) shown in FIG. 7, the overlapping states of the stop blades 1 to 7 are as follows.

In respect of the stop blade 1 and the stop blade 2, a part of the blade portion 1b of the stop blade 1 overlaps the base portion 2a of the stop blade 2, and another part of the blade portion 1b of the stop blade 1 overlaps the blade portion 2b of the stop blade 2. Further, in respect of the stop blade 1 and the stop blade 7, a part of the blade portion 7b of the stop blade 7 overlaps the base portion 1a of the stop blade 1, and another part of the blade portion 7b of the stop blade 7 overlaps the blade portion 1b of the stop blade 1. In the half-opened state and the small-opened state described above, the stop aperture is formed by only the blade portions 1b to 7b of the stop blades 1 to 7. That is, the stop aperture is formed by only the blade portions 1b to 7b that are thinner than the base portions 1a to 7a without using the base portions 1a to 7a.

As described above, in all of the operation states including the full-opened state, the half-opened state, and the small-opened state, the base portions including the first and second boss portions and being thicker than the blade portion in the two adjacent stop blades never overlap each other. Accordingly, a thickness of a space for housing the stop blades 1 to 7 in the optical axis direction between the rotating member 8 and the cam member 9 can be reduced. Thus, the dimension (thickness) of the aperture stop unit 105 in the optical axis direction can be reduced.

In addition, the stop aperture formed by only the blade portions 1b to 7b in the small-opened state can reduce the step between a stop aperture plane and the blade portions 1b to 7b surrounding the circumference of the stop aperture in the optical axis direction. This can suppress generation of small-aperture diffraction, which is more easily generated as the step becomes larger. Therefore, deterioration of the optical performance can be reduced.

Although the aperture stop unit having seven stop blades was explained in this embodiment, a plural numbers, other than seven, of stop blades may be used.

According to this embodiment, the thickness of the base portion of the light-amount adjusting blade can be increased such that the resin can stably flow into the entire base portion in the mold when the light-amount adjusting blade is injection-molded. Therefore, the light-amount adjusting blade having accurate dimension can be formed, and the thickness of the blade portion can be reduced, thereby enabling reduction of the thickness of the light-amount adjusting apparatus. Moreover, the reduction of the thickness of the blade portion can reduce the step between the blade portions and the light-passing aperture, thereby enabling reduction of negative effects on the optical performance of the optical apparatus. In other words, the optical apparatus having a good optical performance can be realized.

Embodiment 2

Figure 18:
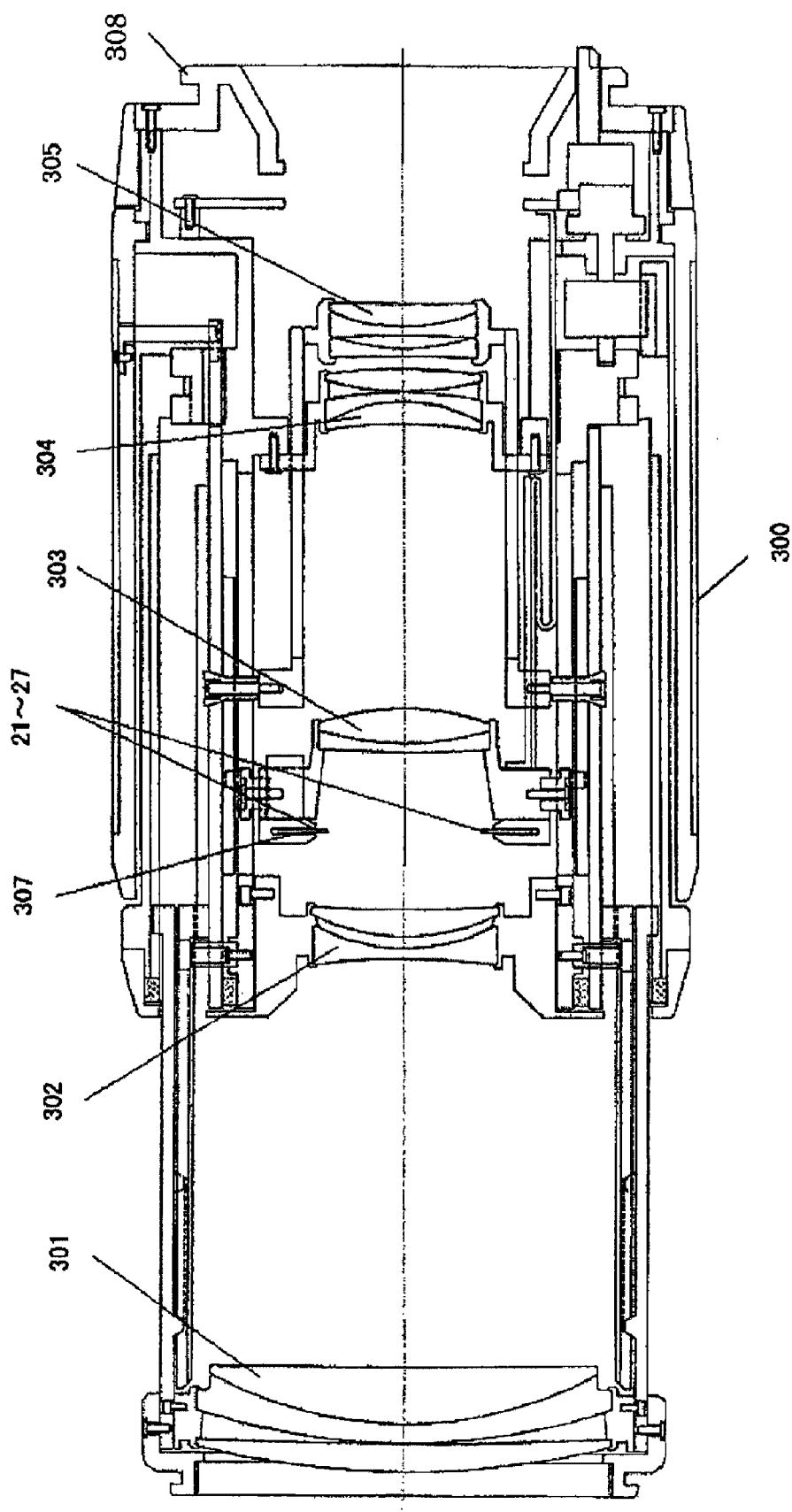
FIG. 18 is a sectional view showing an interchangeable lens provided with the aperture stop unit of Embodiment 2.

With reference to FIG. 18, an interchangeable lens (optical apparatus) in which an aperture stop unit (light-amount adjusting apparatus) that is Embodiment 2 of the present invention is provided will be described.

In the interchangeable lens 300, reference numerals 301 to 305 respectively denote a first lens unit to a fifth lens unit. Reference numeral 307 denotes an aperture stop unit. In the interchangeable lens 300, the aperture stop unit 307 is disposed between the second lens unit 302 and the third lens unit 303. The aperture stop unit 307 includes a plurality of stop blades (light-amount adjusting blades) 21 to 27, each being integrally formed by resin molding.

Reference numeral 308 is a mount with which the interchangeable lens 300 is mounted to a camera (not shown).

In the interchangeable lens 300, for the aperture stop unit 307, a first lens unit side is an object side, and a mount side is an image side (image-pickup element side).

Figure 9:
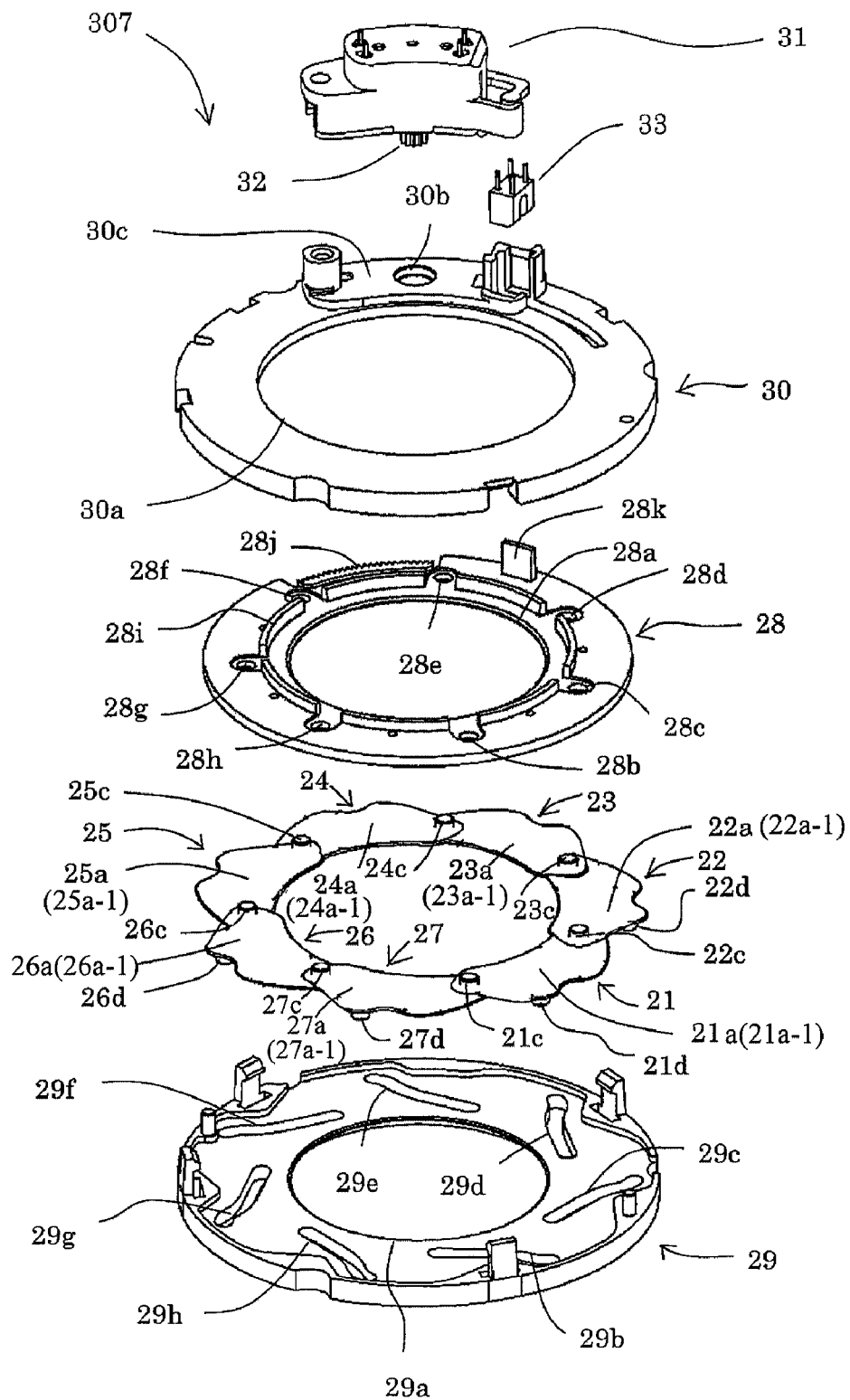
FIG. 9 is an exploded perspective view showing an aperture stop unit that is Embodiment 2 of the present invention.

Next, the configuration of the aperture stop unit 307 will be described in detail with reference to FIG. 9. FIG. 9 is an exploded view of the aperture stop unit 307.

In FIG. 9, reference numerals 21, 22, 23, 24, 25, 26 and 27 are stop blades serving as light-amount adjusting blades. Each of the stop blades 21 to 27 is a component integrally molded with synthetic resin. The stop blades respectively include blade portions 21a, 22a, 23a, 24a, 25a, 26a, and 27a that have a shape of a thin plate. In the blade portions 21a to 27a, at base end portions on first blade surfaces 21a-1 to 27a-1 facing upwardly in the figure, first boss portions 21c, 22c, 23c, 24c, 25c, 26c and 27c serving as a rotation center of each stop blade are respectively formed. In the blade portions 21a to 27a, at base end portions on second blade surfaces facing downwardly in the figure, second boss portions 21d, 22d, 23d, 24d, 25d, 26d and 27d (only 21d, 22d, 26d and 27d are shown in FIG. 9) serving as a driven portion of each stop blade to which a driving force is to be input are respectively formed.

Reference numeral 28 denotes a ring-shaped rotating member formed with an aperture portion 28a at a center thereof. The rotating member 28 includes boss hole portions 28b, 28c, 28d, 28e, 28f, 28g and 28h formed at seven portions therein in its circumferential direction, rib portions 28i divided into seven in the circumferential direction, and a gear portion 28j formed at part of the rotating member 28 in the circumferential direction. The rotating member 28 also includes a light shielding portion 28k at one place therein in the circumferential direction.

Reference numeral 29 denotes a ring-shaped cam member serving as a base member of the aperture stop unit 307. An aperture portion 29a is formed at a center of the cam member 29. Seven cam groove portions 29b, 29c, 29d, 29e, 29f, 29g and 29h are formed in the cam member 29 in its circumferential direction.

Reference numeral 30 denotes a ring-shaped retaining member formed with an aperture portion 30a at a center thereof. The retaining member 30 is provided with a hole portion 30b and a motor attachment portion 30c at one place thereof in its circumferential direction.

Reference numeral 31 denotes a stepping motor driving the rotating member 28. A pinion gear 32 is attached to an output shaft of the stepping motor 31. The stepping motor 31 is fixed to the motor attachment portion 30c of the retaining member 30.

The pinion gear 32 penetrates through the hole portion 30b of the retaining member 30 and meshes with the gear portion 28j of the rotating member 28. The rotating member 28, the cam member 29, the stepping motor 31 and the pinion gear 32 constitute a driving mechanism.

Reference numeral 33 denotes an initial position sensor including a photo interrupter. When the light shielding portion 28k formed in the rotating member 28 is inserted between a light-projecting portion and a light-receiving portion of the initial position sensor 33, it can be detected that the rotating member 28 is located at an initial position. The initial position described here corresponds to a position where a diameter (size) of a stop aperture (light-passing aperture) formed by the stop blades 21 to 27 is largest as a full-opened aperture.

The retaining member 30 is fixed to the cam member 29 such that the rotating member 28 and the stop blades 21 to 27 are disposed between the cam member 29 and the retaining member 30, and thus the retaining member 30 prevents the rotating member 28 and the stop blades 21 to 27 from disengaging from the cam member 29 in an optical axis direction (light-passing direction). The rib portions 28i of the rotating member 28 are rotatably inserted into the aperture portion 30a of the retaining member 30. Outer circumferential surfaces of the rib portions 28i of the rotating member 28 slide with respect to an inner circumferential surface of the aperture portion 30a of the retaining member 30, thereby rotatably supporting the rotating member 28. The respective first boss portions 21c to 27c of the stop blades 21 to 27 are rotatably inserted into the boss hole portions 28b to 28h formed in the rotating member 28. Additionally, the second boss portions 21d to 27d are respectively inserted into the cam groove portions 29b to 29h formed in the cam member 29.

When the stepping motor 31 fixed to the retaining member 30 rotates the pinion gear 32, the rotating member 28 whose gear portion 28j meshes with the pinion gear 32 is rotated. Accordingly, the second boss portion in each stop blade moves along each cam groove portion of the cam member 29 (that is, the second boss portion receives the driving force from the cam groove portion) to rotate the stop blade about the first boss portion.

The stop blades 21 to 27 are arranged at even interval around an optical axis (a center position of the aperture portions 28a and 29a). Parts of the stop blades 21 to 27 overlap each other to form the stop aperture, which is the light-passing aperture, at the inside of the stop blades 21 to 27. The rotation of the stop blades 21 to 27 changes the overlapping amount thereof, and thereby the diameter of the stop aperture (stop aperture diameter) changes continuously. The stop aperture diameter reduces as the overlapping amount of the stop blades 21 to 27 increases. The number of driving pulse signals sent to the stepping motor 31 is counted from the initial position as a reference detected by the initial position sensor 33 to control the stop aperture diameter, thereby enabling adjustment of the light amount.

Figure 10:
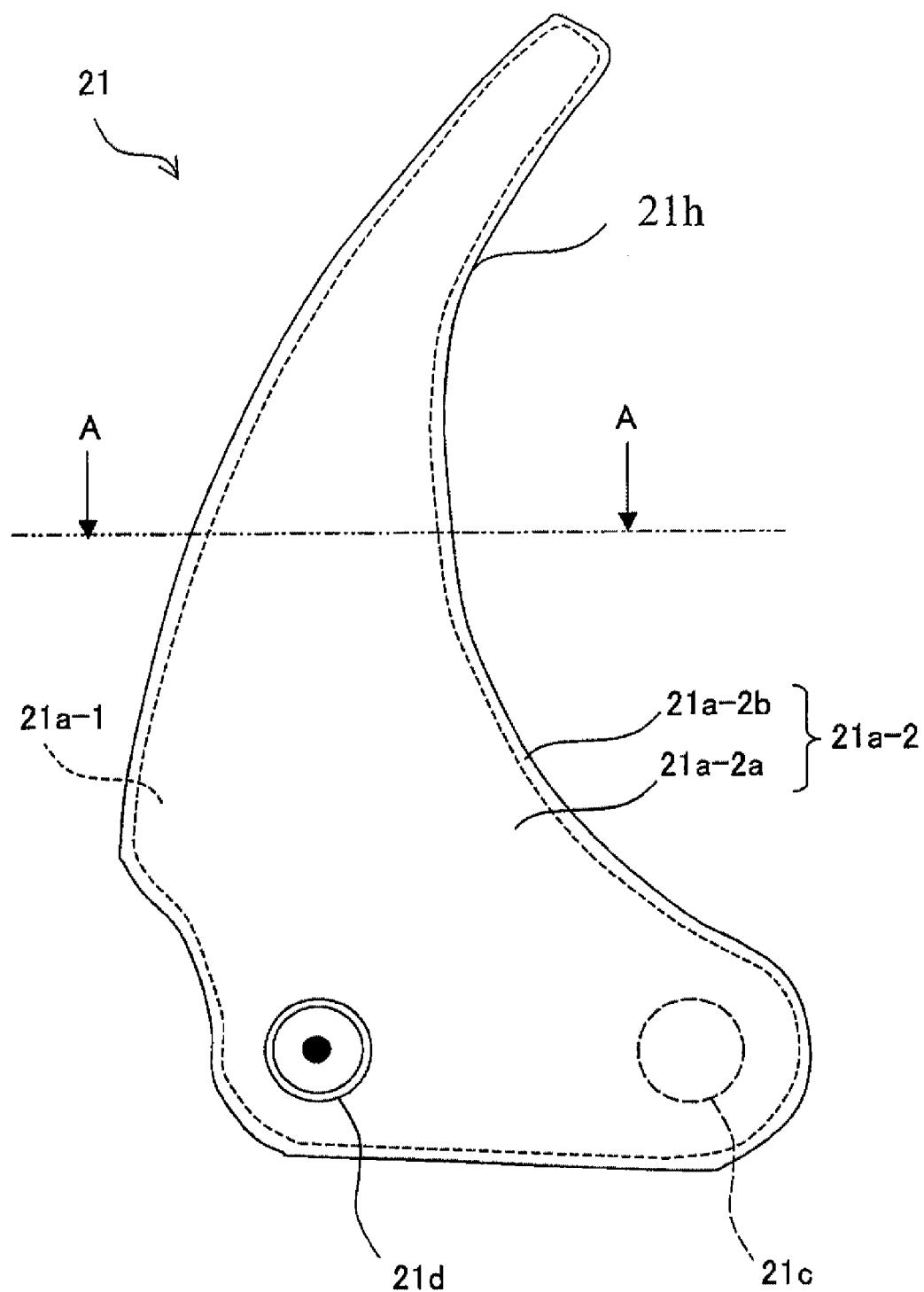
FIG. 10 is a plane view of a stop blade used for the aperture stop unit of Embodiment 2.
Figure 11:
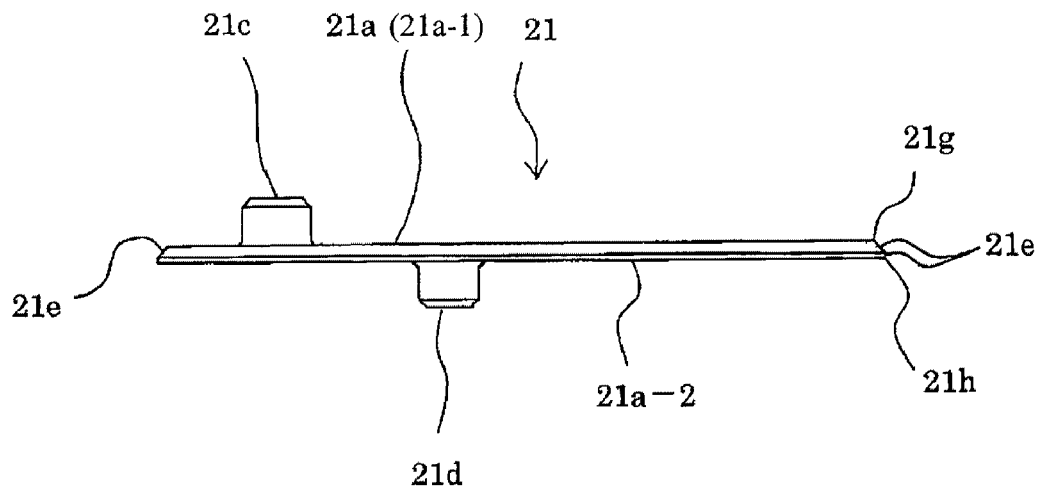
FIG. 11 is a side view of the stop blade in Embodiment 2.

Next, the shape of the stop blades 21 to 27 will be described. FIG. 10 shows the stop blade 21 on behalf of the seven stop blades 21 to 27 as viewed from a second blade surface side. FIG. 11 is a side view of the stop blade 21. The shapes of the stop blades 22 to 27 are the same as that of the stop blade 21.

As described above, the second boss portion 21d is formed on the second blade surface 21a-2, and the first boss portion 21c is formed on the first blade surface 21a-1.

Reference numeral 21h denotes a peripheral edge of the blade portion 21a. The second blade surface 21a-2 extends to the peripheral edge 21h. A peripheral end surface 21e is formed between the peripheral edge 21h and the first blade surface 21a-1 so as to surround the blade portion 21a.

The peripheral end surface 21e is formed as an inclined surface inclined with respect to the thickness direction (optical axis direction) of the blade portion 21a such that an edge portion 21g on a first blade surface side is located more inwardly of the blade portion 21a than an edge portion (peripheral edge of the blade portion 21a) 21h on the second blade surface side. In this embodiment, the peripheral end surface 21e is formed as a two-step inclined surface including two inclined surfaces having different inclination angles from each other. The inclination angle of the first-blade-surface-side inclined surface is larger than that of the second-blade-surface-side inclined surface.

Figure 12:
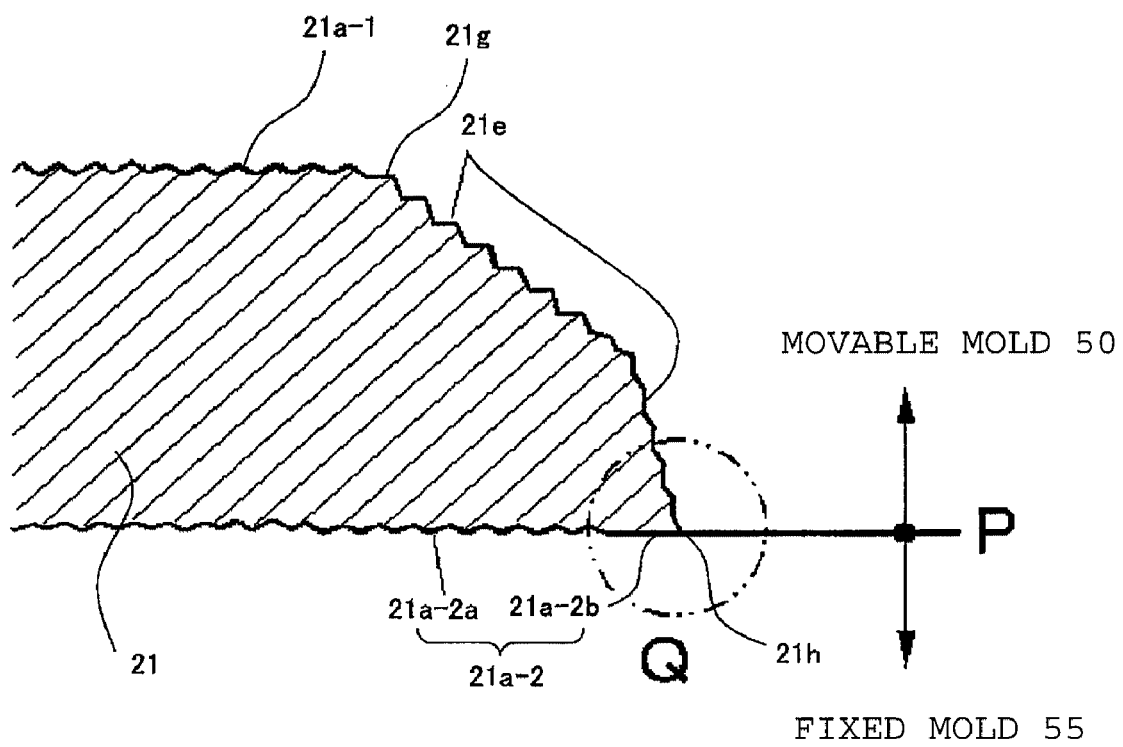
FIG. 12 is a partially enlarged sectional view showing the stop blade (mold configuration) in Embodiment 2.
Figure 17:
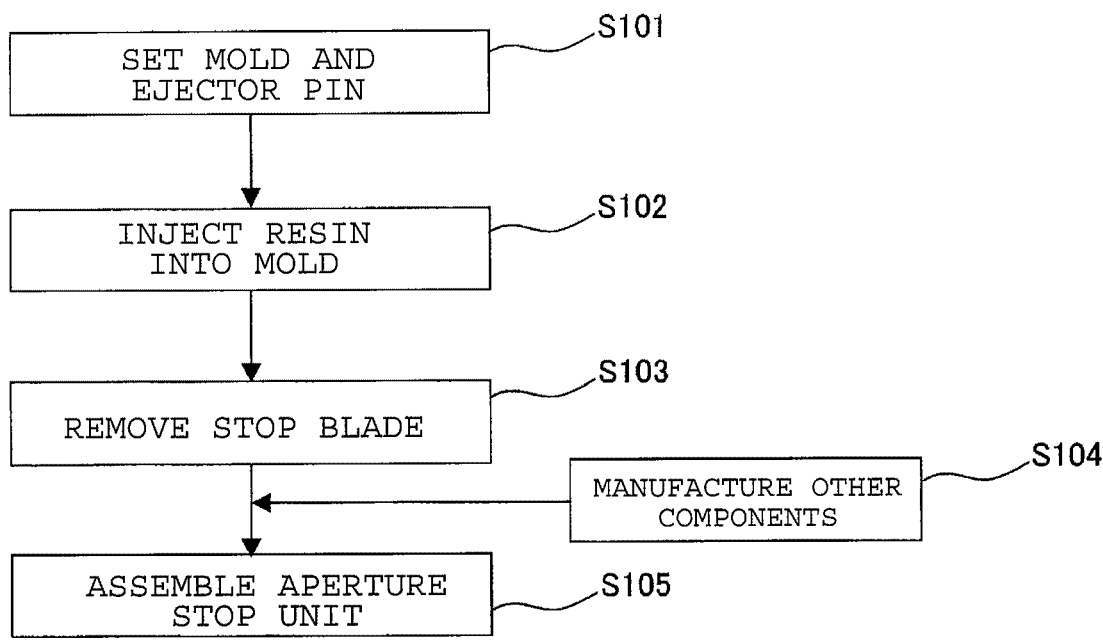
FIG. 17 is a flow chart showing a method for manufacturing the aperture stop unit of Embodiment 2.

Next, a method for manufacturing the stop blade 21 and the aperture stop unit 307 will be described with reference to FIGS. 12 and 17. FIG. 12 shows an enlarged, A-A cross sectional view of the stop blade 21 shown in FIG. 10. FIG. 17 is a flow chart showing the manufacturing method.

In Step 101 (abbreviated as S) in FIG. 17, an ejector pin (not shown) and a mold including an injection gate are set in an injection mold apparatus (not shown). As shown in FIG. 12, a movable mold (first mold) 50 and a fixed mold (second mold) 55 are used. The movable mold 50 forms the first blade surface 21a-1, the peripheral end surface 21e and the first boss portion 21c of the stop blade 21. The fixed mold 55 forms the second blade surface 21a-2 and the second boss portion 21d thereof. The shapes of forming surfaces of the movable mold 50 and the fixed mold 55 for forming the stop blade 21 will be described later.

The injection gate is disposed at the position where the first boss portion 21c is located, and the ejector pin is disposed at the position where the second boss portion 21d is located. Note that the injection gate may be disposed at the position where the second boss portion 21d is located, and the ejector pin may be disposed at the position where the first boss portion 21c is located.

In Step 102, molten synthetic resin is injected (filled) into the molds 50 and 55, and then the resin is cured.

In Step 103, the cured stop blade 21 is pushed with the ejector pin to be removed from the molds 50 and 55.

In Step 104, components included in the aperture stop unit 307 other than the stop blades 21 to 27 (the cam member 29, the rotating member 28, the retaining member 30, and the stepping motor 31) are manufactured.

Finally, in Step 105, the stop blades 21 to 27 removed from the molds 50 and 51 in Step 103, the cam member 29, the rotating member 28, the retaining member 30, and the stepping motor 31 that are manufactured in Step 104 are combined with each other as described above to assemble the aperture stop unit 307.

Figure 13:
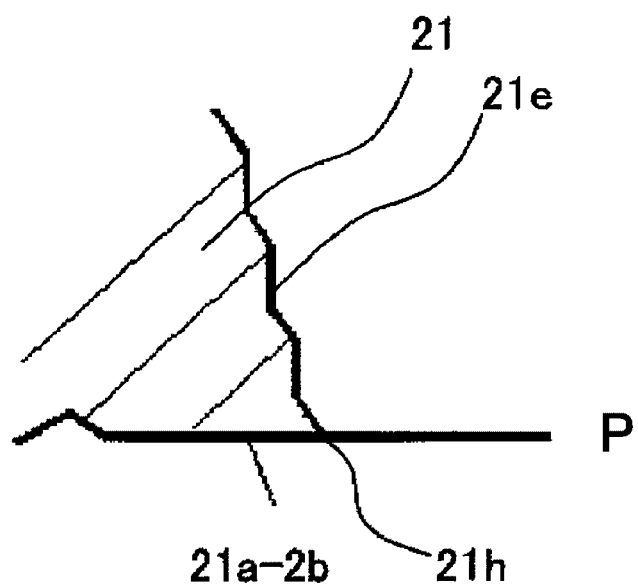
FIG. 13 is an enlarged sectional view showing part of the stop blade shown in FIG. 12.

Next, the shapes of the forming surfaces of the movable mold 50 and the fixed mold 55 for forming the stop blade described above will be explained with reference to FIGS. 12 and 13. FIG. 13 shows an enlarged view of a boundary part Q between the peripheral end surface 21e (peripheral edge 21h shown in FIGS. 10 and 11) and the second blade surface 21a-2 in the stop blade 21 shown in FIG. 12. Reference symbol P shown in FIGS. 12 and 13 represent a boundary line (parting line) between the movable mold 50 and the fixed mold 55, and a hatched portion represents the stop blade 21 to be molded.

The forming surface of the movable mold 50 for forming a fine rough shape is subjected to a matt process. Therefore, the rough shape that is a non-smooth shape is transferred to the first blade surface 21a-1 and the peripheral end surface 21e of the molded stop blade 21. Thereby, the whole of the first blade surface 21a-1 and peripheral end surface 21e are formed as matt surfaces. The non-smooth shape of the matt surface diffusely reflects light incident thereon.

On the other hand, the forming surface of the fixed mold 55 is subjected to a matt process so that an area (first area) 21a-2a which is most of the second blade surface 21a-2 is formed as the matt surface. However, in the forming surface of the fixed mold 55, an area located more outwardly than a matt processed area is not subjected to the matt process, but formed as a smooth surface having a smoother shape than the non-smooth shape formed by the matt process. Accordingly, in the second blade surface 21a-2, an area (second area) 21a-2b between a peripheral edge of the matt surface area 21a-2a and a boundary (that is, the peripheral edge 21h of the second blade surface 21a-2) between the peripheral end surface 21e and the second blade surface 21a-2 is formed as a smooth surface having a smoother shape than the non-smooth shape of the matt surface. The second area 21a-2b is hereinafter referred to as the smooth surface area.

According to this mold configuration, the matt-processed forming surface of the movable mold 50 and the smooth surface area of the fixed mold 55 are put together at the parting line P. Therefore, burrs are hardly generated on the parting line P at the peripheral portion of the stop blade 21. Further, the stop blade 21 having a stable thickness can be obtained. These are the same for the stop blades 22 to 27.

Thus, an actual stop aperture diameter can be prevented from being reduced with respect a designed diameter due to the burrs generated at the peripheral portions of the stop blades 21 to 27 that determine the stop aperture diameter. Further, generation of unnecessary light due to light unexpectedly refracted at translucent thin burrs can be avoided. Accordingly, good optical performances of the aperture stop unit 307 and the interchangeable lens 300 provided with that aperture stop unit 307 can be ensured.

Moreover, generation of dust due to the burrs can be avoided, the dust being generated by the burrs on the stop blade making into contact with each other to be removed from the stop blade in the assembling or operation of the aperture stop unit 307.

Figure 14:
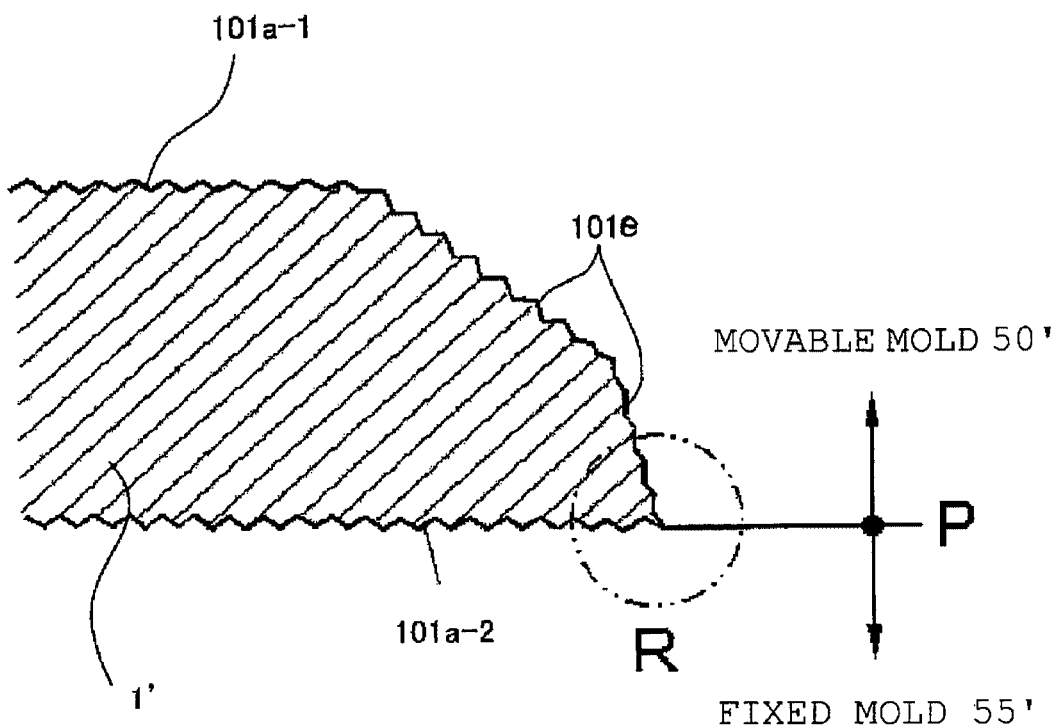
FIG. 14 is a partially enlarged sectional view showing a conventional stop blade (mold configuration).
Figure 15:
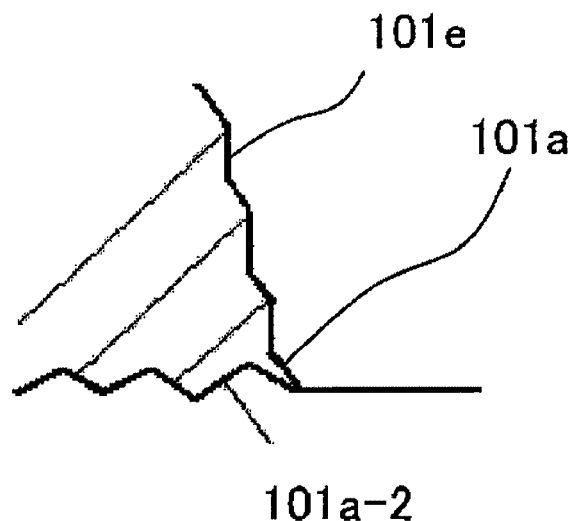
FIG. 15 is an enlarged sectional view showing part of the conventional stop blade shown in FIG. 14.

FIGS. 14 and 15 show the configuration of a mold for forming a conventional stop blade 1'. FIG. 15 is an enlarged view of a part R in FIG. 14. In the figures, reference numerals 101a-1 and 101a-2 respectively denote a first blade surface and a second blade surface, and 101e denotes a peripheral end surface.

As shown in the figures, in a case where all of the forming surfaces of a movable mold 50' and a fixed mold 55' for forming the stop blade are matt processed surface, the matt processed portion of the movable mold 50' and that of the fixed mold 55' are put together at the parting line P. Thus, a burr 101a is generated at the peripheral end portion of the molded stop blade 1'.

Therefore, an actual stop aperture diameter is reduced with respect a designed diameter due to the burr 101a generated at the peripheral portions of the stop blades 1' that determines the stop aperture diameter. Further, unnecessary light is generated due to light unexpectedly refracted at the burr 101a.

For those reasons, it is impossible to ensure good optical performances of the aperture stop unit and an interchangeable lens provided with that aperture stop unit. Moreover, the burr is removed from the stop blade to generate dust in the assembling or operation of the aperture stop unit.

The aperture stop unit 307 including the stop blades 21 to 27 formed as shown in FIGS. 12 and 13 is disposed in the interchangeable lens 300 shown in FIG. 18 such that the second blade surface 21*a*-2 faces the image side, that is, faces an opposite side of a light-entrance side from the object.

Accordingly, the light entering the interchangeable lens 300 from the object does not directly reach the smooth surface area 21*a*-2*b* formed on the second blade surface 21*a*-2. Therefore, even if such a smooth surface area is provided in the stop blade, it is most unlikely that the light reflected on the smooth surface area becomes the unnecessary light such as ghost.

Figure 16:
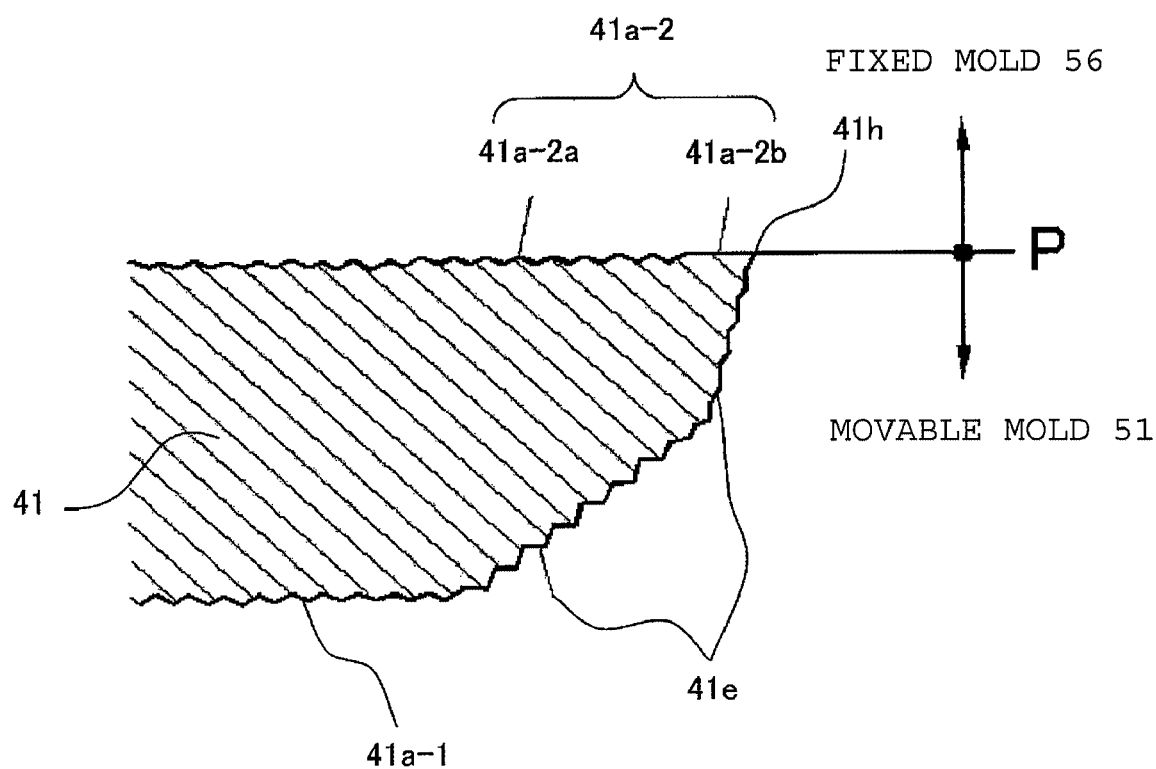
FIG. 16 is a partially enlarged sectional view showing a stop blade (mold configuration) as a modified example of Embodiment 2.

The aperture stop unit 307 may be disposed such that the second blade surface 21*a*-2 faces the object side in the interchangeable lens. In this case, the mold configuration shown in FIG. 16 is employed. Reference symbol P denotes a parting line between the fixed mold 56 and the movable mold 51, and a hatched portion shows a stop blade 41 to be molded.

A forming surface of the movable mold 51 is a matt processed surface, so that a rough shape, that is, a non-smooth shape is transferred to a first blade surface 41*a*-1 and a peripheral end surface 41*e* of the stop blade 41. Thus, whole part of the first blade surface 41*a*-1 and the peripheral end surface 41*e* are formed as matt surfaces.

On the other hand, a forming surface of the fixed mold 56 is subjected to the matt process to form an area (first region) 41*a*-2*a* that is most of a second blade surface 41*a*-2 as the matt surface. However, in the forming surface of the fixed mold 56, an area located more outwardly than the matt processed area is not subjected to the matt process, but formed as a smooth surface having a smoother shape than the non-smooth shape formed by the matt process. Accordingly, in the second blade surface 41*a*-2, an area (second area) 41*a*-2*b* between a peripheral edge of the matt surface area 41*a*-2*a* and a boundary (that is, a peripheral edge 41*h* of the second blade surface 41*a*-2) between the peripheral end surface 41*e* and the second blade surface 41*a*-2 is formed as a smooth surface having a smoother shape than the non-smooth shape of the matt surface. The second area 41*a*-2*b* is hereinafter referred to as the smooth surface area. After the stop blade 41 is molded, anti-reflection processing such as matt painting on the smooth surface region 41*a*-2*b* can reduce reflection of the light entering the interchangeable lens from the object.

According to this embodiment, while the light reflected on the non-smooth surface formed in most part of the light-amount adjusting blade is suppressed to become the unnecessary light, generation of the burrs can be avoided at the peripheral portion in the light-amount adjusting blade when the light-amount adjusting blade is molded with resin.

Embodiment 3

Figure 19:
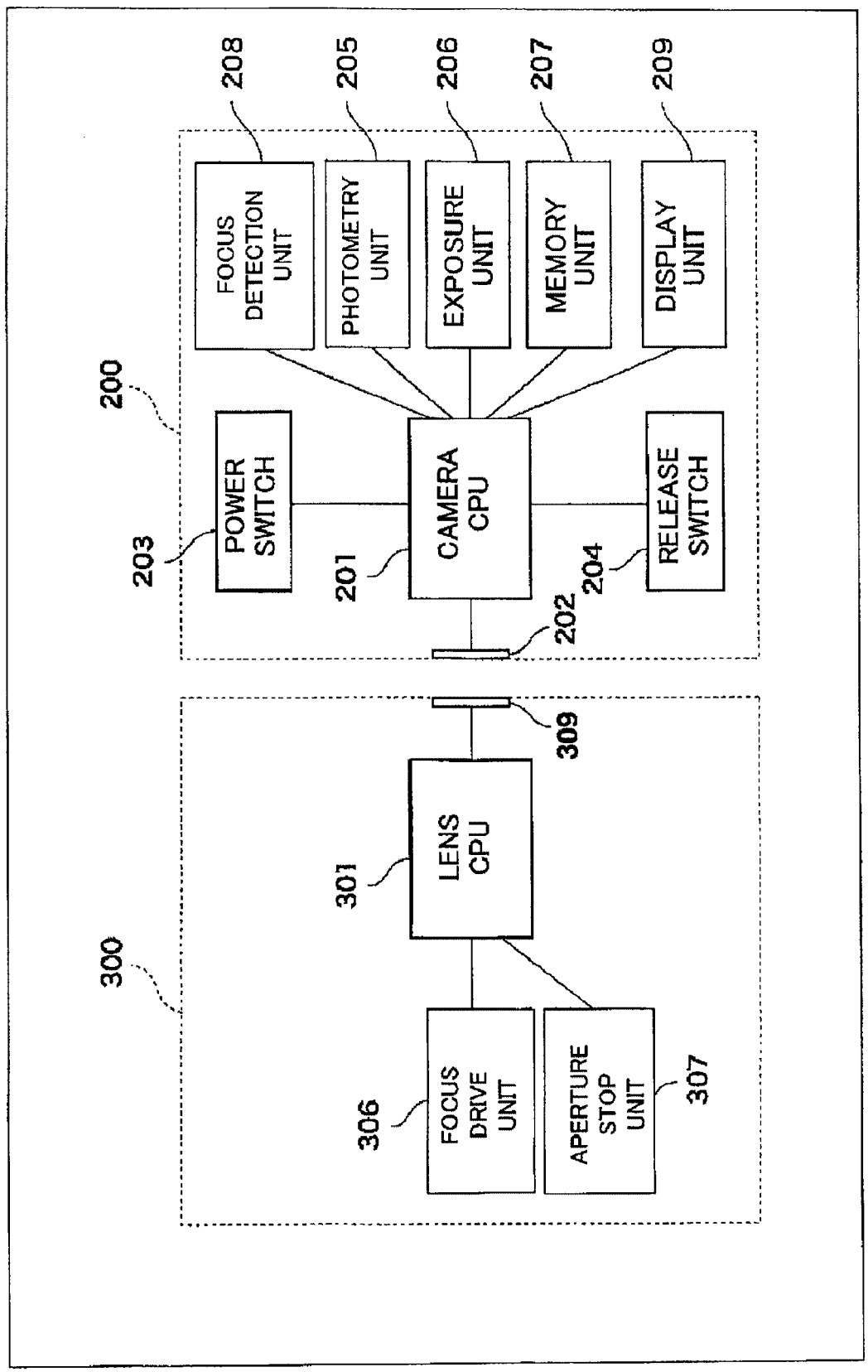
FIG. 19 is a block diagram showing the configuration of an image-pickup system constituted by the interchangeable lens provided with the aperture stop unit of Embodiment 2 and a camera.
Figure 20:
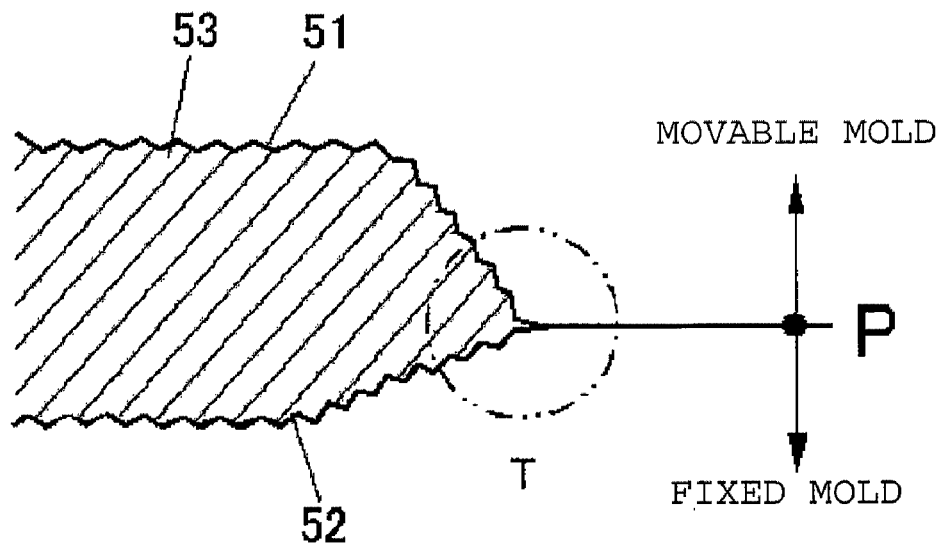
FIG. 20 is a partially enlarged sectional view showing a conventional stop blade (mold configuration).
Figure 21:
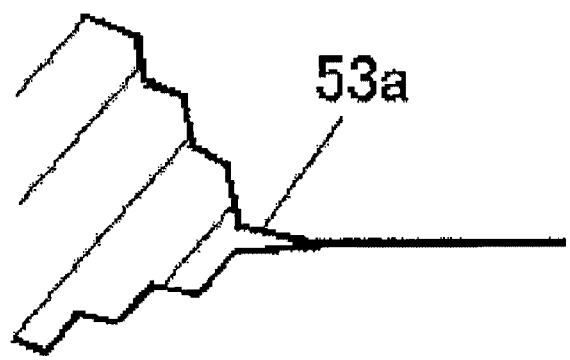
FIG. 21 is an enlarged sectional view showing part of the conventional stop blade shown in FIG. 20.

Next, an image-pickup system that is Embodiment 3 of the present invention will be described, the image-pickup system being constituted by the interchangeable lens including the aperture stop unit 105 or 307 described in the above Embodiments 1 or 2 and a camera on which the interchangeable lens is detachably mounted with reference to FIG. 19. Here, the image-pickup system will be described which is constituted by the interchangeable lens 300 including the aperture stop unit 307 described in Embodiment 2 and the camera on which the interchangeable lens 300 is detachably mounted. However, the interchangeable lens 500 including the aperture stop unit 105 described in Embodiment 1 may be used in stead of the interchangeable lens 300.

The camera 200 is provided with a power switch 203, a release switch 204 and a camera CPU 201. The interchangeable lens 300 is provided with a lens CPU 301, a focus drive unit 306 and the aperture stop unit 307.

The camera CPU 201 is constituted by a microcomputer, which controls a focus detection unit 208, a photometry unit 205, an exposure unit 206, a memory unit 207 and a display unit 209. The camera CPU 201 communicates with the lens CPU 301 via a camera contact 202 and a lens contact 309 in a state in which the interchangeable lens 300 is mounted on the camera 200.

When the power switch 203 is turned on, the camera CPU 201 is started to operate to supply the power to each of the actuators and sensors in the system.

The release switch 204 is a two-stroke switch. An operation signal from the release switch 204 is input to the camera CPU 201. A first stroke operation of the release switch 204 causes the camera CPU to perform photometry with the photometry unit 205 and focus detection with focus detection unit 208. Then, the camera CPU 201 calculates an exposure amount and a driving amount of a focus lens (not shown), based on the photometry result and the focus detection result. Information on the driving amount of the focus lens is sent to the lens CPU 301. The lens CPU 301 drives the focus lens via the focus drive unit 306 for focusing.

A second stroke operation of the release switch 204 causes the camera CPU 201 to send a driving instruction for the aperture stop unit 307 to the lens CPU 301. The lens CPU 301 drives the aperture stop unit 307 in response to the driving instruction. The camera CPU 201 sends an exposure starting instruction to the exposure unit 206 for causing a shutter (not shown) to open and close and for causing an image-pickup element (not shown) such as a CCD sensor and a CMOS sensor to accumulate electric charges. When the exposure is completed, an image generated based on signals read from the image-pickup element is stored in the memory unit 207.

The display unit 209 displays various image-pickup conditions such as an aperture value and a shutter speed, the number of captured images, a remaining amount of battery, operation modes and captured images in accordance with the instructions from the camera CPU 201.

While exemplary embodiments of the present invention have been described, the present invention is not limited to these embodiments and various variations and modifications may be made without departing from the scope of the present invention.

For example, Embodiment 3 described the case where the aperture stop unit is provided in the interchangeable lens constituting a lens-interchangeable type image-pickup system. However, the aperture stop unit may be provided in a lens-integrated image-pickup apparatus (optical apparatus).

Further, each of the above embodiments described the light-amount adjusting apparatus provided in the optical apparatus for image pickup. However, light-amount adjusting apparatuses similar to those described in the above embodiments may be provided in optical apparatuses used for other than image pickup, such as a projector.

Moreover, each of the above embodiments described a so-called iris type light-amount adjusting apparatus including seven light-amount adjusting blades. However, the present invention can be applied to light-amount adjusting apparatuses including light-amount adjusting blades whose number is other than seven and to other types of light-amount adjusting apparatuses than the iris type.

Furthermore, the present invention is not limited to these preferred embodiments and various variations and modifications may be made without departing from the scope of the present invention.

This application claims foreign priority benefits based on Japanese Patent Applications Nos. 2007-040091, filed on Feb. 20, 2007 and 2007-029757. filed on Feb. 8, 2007, and each of which is hereby incorporated by reference herein in its entirety as if fully set forth herein.

What is claimed is:

1. A light-amount adjusting apparatus comprising a plurality of light-amount adjusting blades that causes a size of a light-passing aperture to change by rotation thereof,
   wherein each of the light-amount adjusting blades includes:
   a base portion on which a rotation center portion and a driven portion are formed; and
   a blade portion that overlaps the base portion of an adjacent light-amount adjusting blade in a light-passing direction when the light-amount adjusting apparatus is in a full-opened state, and the blade portion overlaps the base portion and the blade portion of the adjacent light-amount adjusting blade in the light-passing direction when the plurality of light-amount adjusting blades is rotated to set the light-passing aperture to be smaller than in the full-opened state,
   wherein a thickness of the blade portion is thinner than that of the base portion.

2. A light-amount adjusting apparatus according to claim 1, wherein the light-passing aperture smaller than in the full-opened state is formed by only the blade portion of each of the light-amount adjusting blades.

3. A light-amount adjusting apparatus according to claim 1, wherein, a surface inclined with respect to a thickness direction of the light-amount adjusting blade is formed between the base portion and the blade portion in each of the light-amount adjusting blades.

4. An optical apparatus comprising:
   a light-amount adjusting apparatus according to claim 1; and
   an optical system in which a light amount is adjusted by the light-amount adjusting apparatus.

5. A method for manufacturing a light-amount adjusting apparatus that includes a plurality of light-amount adjusting blades causing a size of a light-passing aperture to change by rotation thereof, the method comprising:
   a first step of integrally forming each of the light-amount adjusting blades by injection molding with resin such that each of the light-amount adjusting blades includes:
   a base portion on which two boss portions serving as a rotation center portion and a driven portion are formed, and
   a blade portion that overlaps the base portion of an adjacent light-amount adjusting blade in a light-passing direction when the light-amount adjusting apparatus is in a full-opened state, and the blade portion overlaps the base portion and the blade portion of the adjacent light-amount adjusting blade in the light-passing direction when the plurality of light-amount adjusting blades is rotated to set the light-passing aperture to be smaller than in the full-opened state, a thickness of the blade portion being thinner than that of the base portion, and
   a second step of assembling the light-amount adjusting apparatus using the plurality of light-amount adjusting blades,
   wherein, in the first step, an injection gate is disposed at a position where one of the two boss portions is located, an ejector pin is disposed at a position where the other boss portion is located.

* * * * *